(12) United States Patent
Jung

(10) Patent No.: US 7,816,829 B2
(45) Date of Patent: Oct. 19, 2010

(54) DUAL MOTOR

(76) Inventor: Man-Young Jung, 2780 E. Washington Blvd., Pasadena, CA (US) 91107

( * ) Notice: Subject to any disclaimer, the term of this patent is extended or adjusted under 35 U.S.C. 154(b) by 198 days.

(21) Appl. No.: 12/317,578

(22) Filed: Dec. 24, 2008

(65) Prior Publication Data
US 2010/0156222 A1 Jun. 24, 2010

(51) Int. Cl.
*H02K 21/00* (2006.01)
(52) U.S. Cl. ........................ 310/152
(58) Field of Classification Search .......... 310/152, 310/153
See application file for complete search history.

(56) References Cited
U.S. PATENT DOCUMENTS 5,304,881 A * 4/1994 Flynn et al. ............. 310/156.46
5,925,958 A * 7/1999 Pirc .......................... 310/152
2009/0212650 A1 * 8/2009 Freixas Vila ............... 310/152

* cited by examiner

*Primary Examiner*—Nguyen N Hanh
(74) *Attorney, Agent, or Firm*—Clement Cheng

(57) ABSTRACT

A dual motor has a shaft and a first motor connected to the shaft. The first motor is a standard electrical motor receiving voltage steps. The first motor provides a rotational force to the shaft when the voltage is applied. A second motor is also connected to the shaft, and the second motor is a permanent magnet motor comprising a flexible member connected to the shaft at a flexible member inside end. The permanent magnet motor also has an inside magnet mounted to a flexible member outside end, and the inside magnet moves relative to the shaft. The permanent magnet motor also has an outside housing. An outside magnet is mounted to the outside housing, and stepped voltage application flexes the flexible member. Optionally, stepped voltage application flexes the flexible member so that the outside magnet rotates relative to the inside magnet.

18 Claims, 5 Drawing Sheets

DUAL MOTOR

DISCUSSION OF RELATED ART

While perpetual motion machines have been the subject of inventor speculation since antiquity, most engineers understand that perpetual motion is impossible. On the other hand, striving for highly efficient motors and generators is a worthwhile and noteworthy goal. A variety of inventors have attempted to make highly efficient generators and motors by using permanent magnet drive. For example, Robert Adams' Adams Switched Reluctance Pulsed DC Permanent Magnet Motor Generator built in 1969 provides a design striving to be highly efficient. More recently, permanent magnet motors such as the Perendev have been developed.

Permanent magnet motors use a pair of opposing magnets for driving rotation. Because magnetic potential tends toward an equilibrium, the physical configuration of magnets is typically temporarily rearranged around the equilibrium gate or gates. The mechanical reconfiguration is difficult and may involve a number of moving parts. Because of this, the mechanical rearrangement of magnets on a moving rotor is problematic. On the other hand, a brushless electric motor has very little mechanical wear and complication, but uses a substantial amount of electricity.

32 Inside Magnet First Polarity
34 Inside Magnet Second Polarity
36 Outside Magnet First Polarity
37 Outside Housing
38 Outside Magnet Second Polarity
42 Rotating Spoke
44 Rotating Shaft
82 Motor
88 Flywheel
135 Ramp Surface
136 Ramp
144 Power Shaft

SUMMARY OF THE INVENTION

Figure 1:
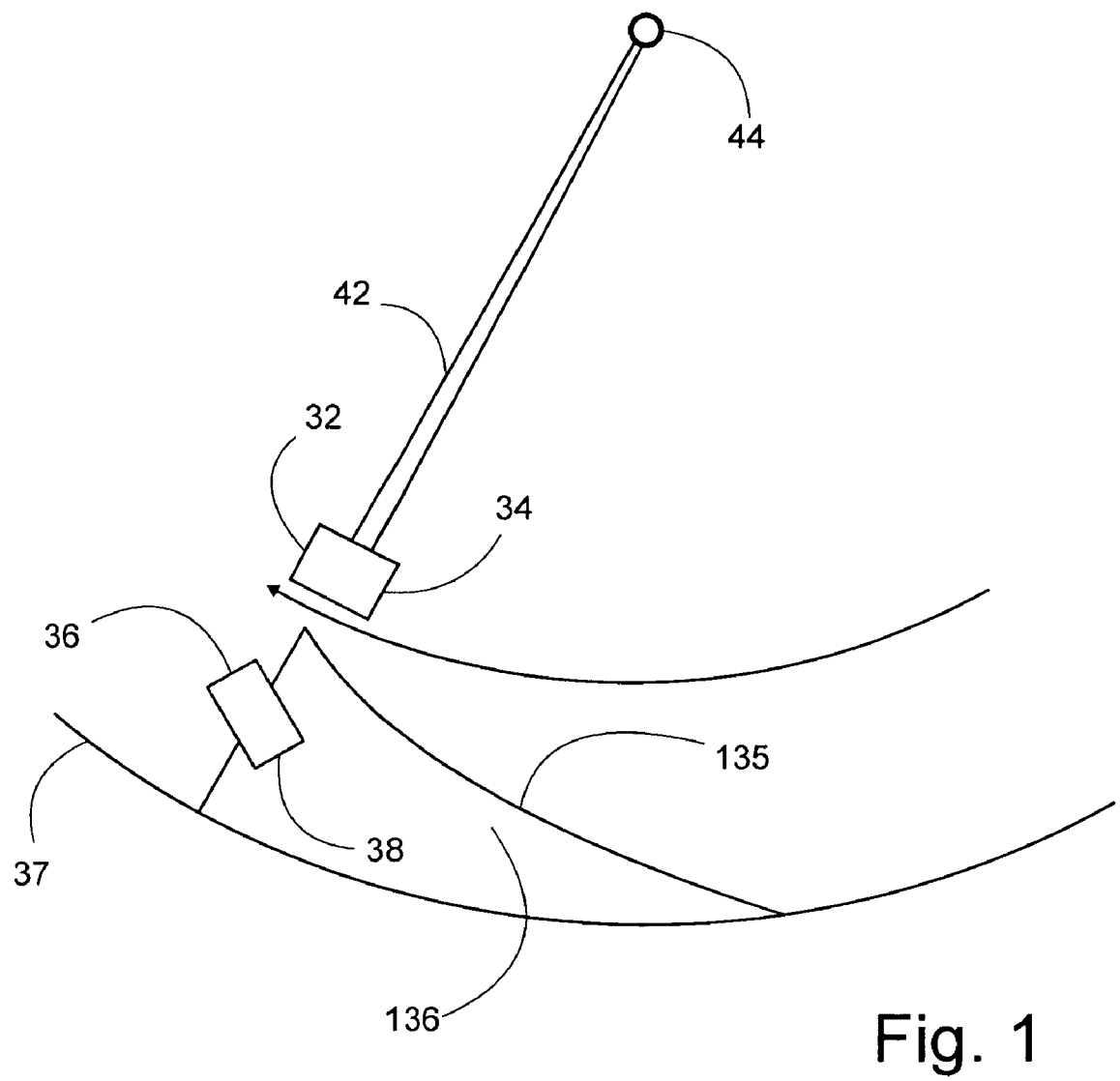
FIG. 1 is a top view diagram of a spoke embodiment of the present invention.

In FIG. 1, 3, 5 the shaft 44 is shown from top view and is generally rotating in a clockwise direction. The preferred embodiment of the present invention is based on attaching an inside magnet to a rotating spoke. The inside magnet has a first polarity 32 and a second polarity 34. The outside magnet has an outside magnet first polarity 36 and an outside magnet second polarity 38. The inside magnet first polarity 32 and second polarity 34 interact with the outside magnet first polarity 36 and second polarity 38. The ramp 136 may be partially embedded with various ferrous materials embedded within for directing magnetic field. The ramp surface 135 may be comprised of a top layer such as a magnetic shield in the form of a sheet of ferrous material like steel to lessen the percentage of force interaction between the inside magnet and the outside magnet as the shaft rotates. The ramp surface in the form of a top layer overlies the ramp 136 and is bonded to the ramp. The ramp may be formed of plastic, metal or a combination of both. The ramp is mounted to the outside housing 37. The outside housing is formed as a circular cylinder to contain rotating members within. The outside magnet is preferably embedded into the ramp so that it is partially exposed and oriented at an angle so that it interacts with the inside magnet.

There are a variety of available configurations of the inside magnet first polarity 32 and the inside magnet second polarity 34 relative to the outside magnet first polarity 36 down to the outside magnet second polarity 38. The inside magnet second polarity 34 can repel from the outside magnet first polarity 36. If the inside magnet and outside magnet repel from each other, they would repel as they draw closer, and repel as they draw apart. A magnetic gate is formed at the area where the repulsion is larger.

Figure 5:
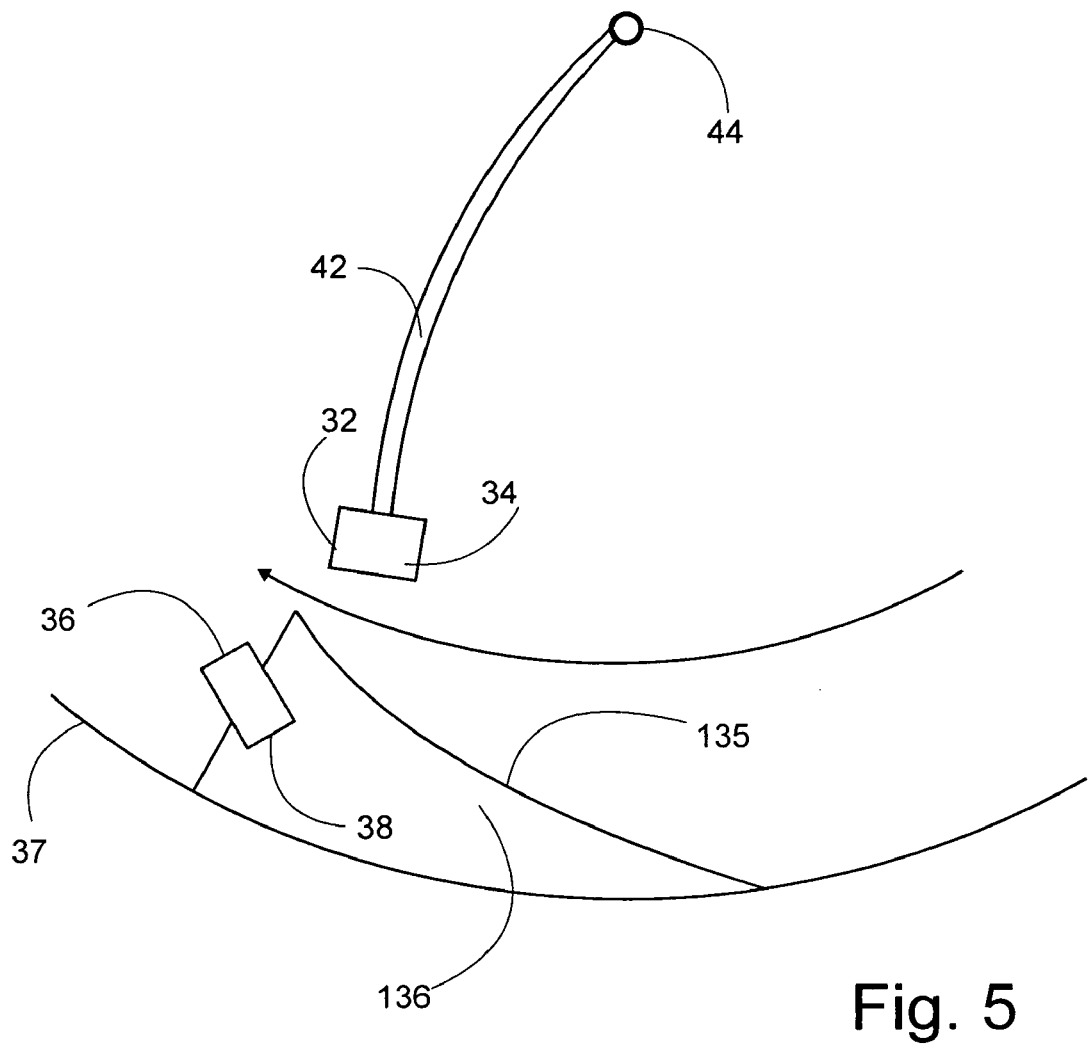
FIG. 5 is a top view diagram of an exaggerated spoke bending embodiment of the present invention.

The rotating spoke 42 is flexible so that it receives a bending force as seen in FIG. 5 so that the rotating spoke moves the magnet first polarity 32 and second polarity 34 to a different position. The bending force is due to the application of a step in voltage applied to the motor. The bending force reorients the inside magnet first polarity 32 and second polarity 34. The bending force of the rotating spoke pulls the magnet first polarity 32 and second polarity 34 away from the outside magnet first polarity 36 and the outside magnet second polarity 38. The bending force of the rotating spoke also bends the rotating spoke so that the magnet passes over the gate. A variety of bending modulus can be used depending upon the strength of the relative magnets, and the rotation desired. The bending modulus is thus analogous to a golf wood shaft, which a user bends during the swing. FIG. 5 is drawn in exaggerated dimensions for clarity purposes.

Figure 2:
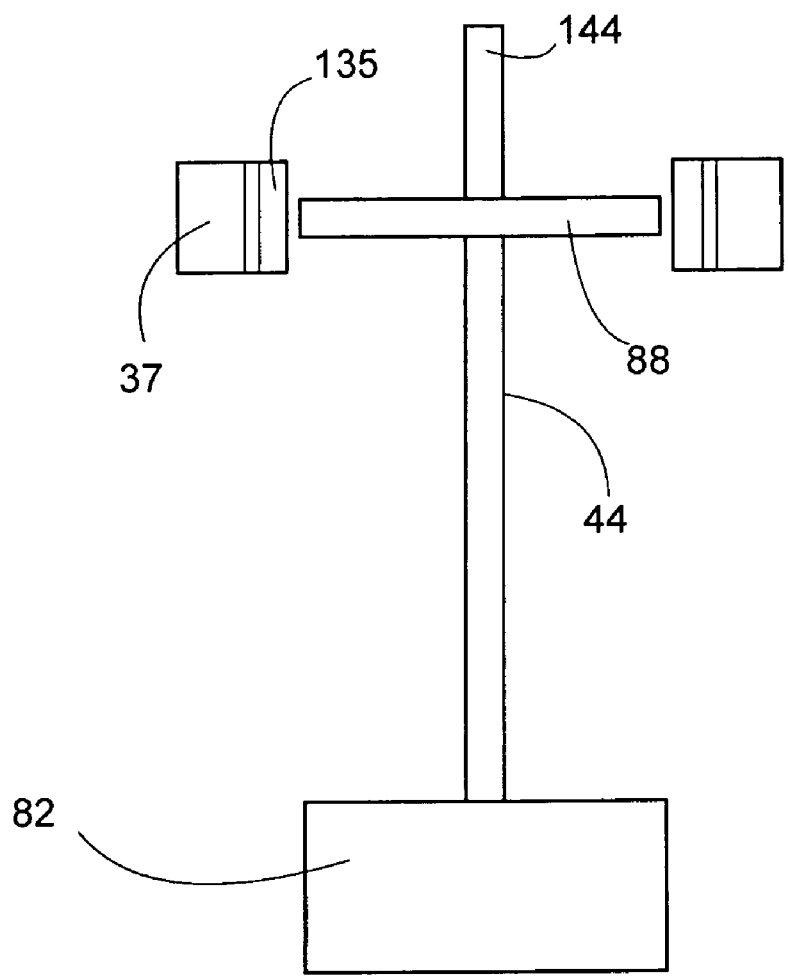
FIG. 2 is a side view diagram of the flywheel embodiment of the present invention.
Figure 3:
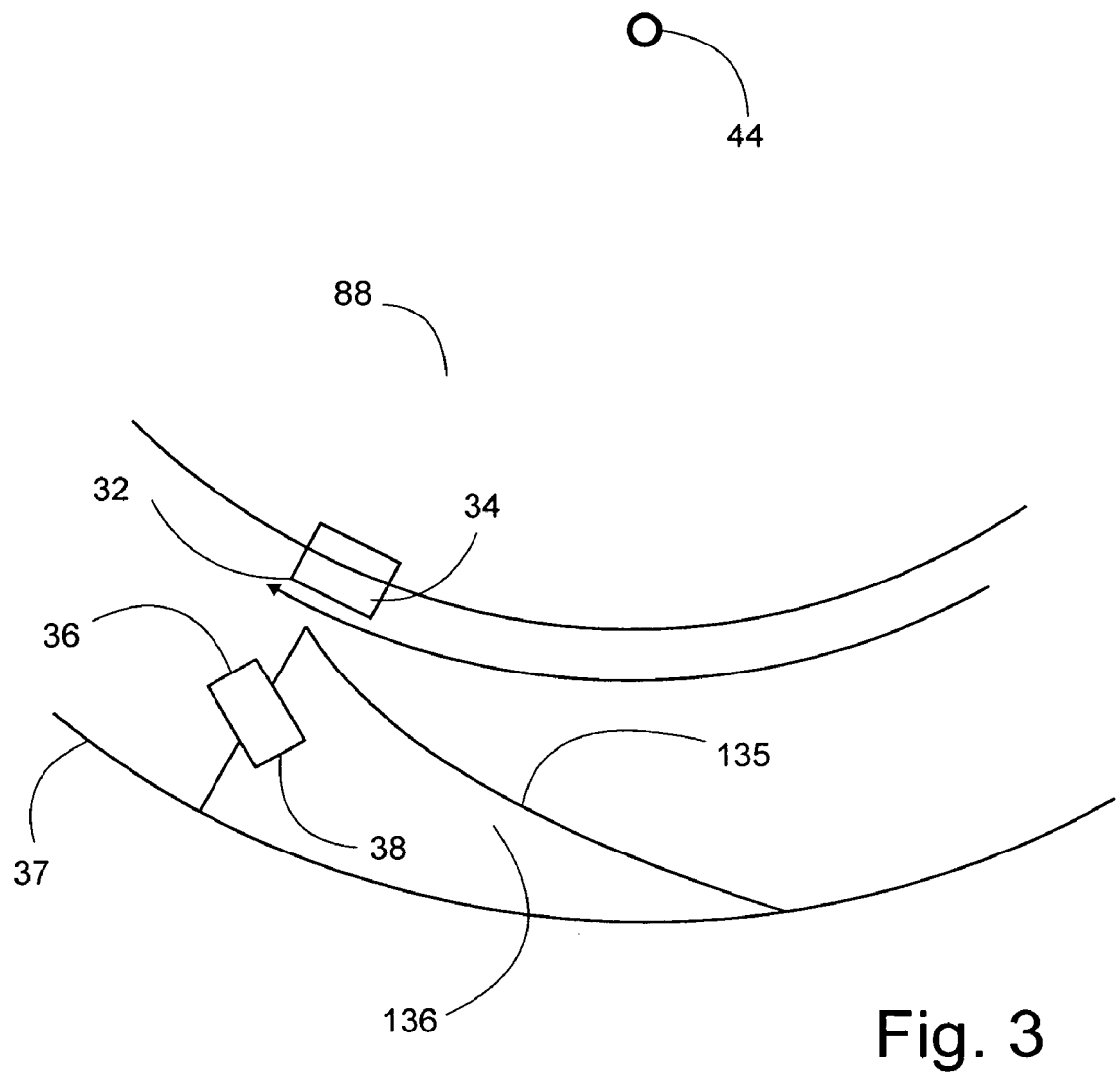
FIG. 3 is a top view diagram of the flywheel embodiment of the present invention.

FIG. 2 shows a motor 82 which is preferably electric and receiving electrical drive on an alternating current, or stepped direct current input. The electrical input is converted by the motor 82 into rotational acceleration of the shaft 44. The shaft 44 rotates the flywheel 88. The flywheel includes an inside magnet FIG. 1 on a shaft, or embedded within a rotating wheel 88 as shown in FIG. 3. The rotating flywheel 88 can be made of a deformable material so that there is angular deformation between the shaft 44 and the inside magnet mounted on the flywheel 88. Preferably, a power shaft 144 receives angular output that is the sum of the forces from the electrical motor 82 and the interaction between the permanent magnet assembly. The permanent magnet assembly is comprised of the inside magnet and the outside magnet arranged in a relationship described above.

Figure 4:
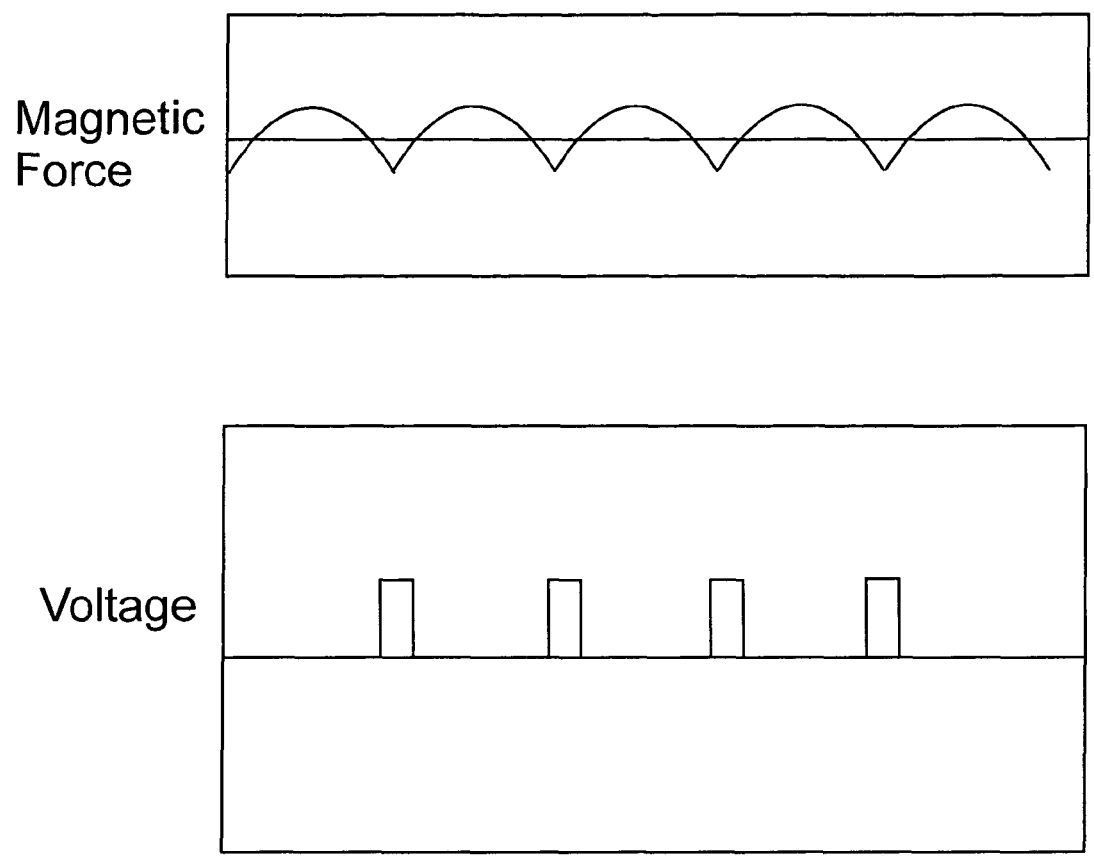
FIG. 4 is a diagram of the force and voltage.

FIG. 4 shows the magnetic force in positive clockwise rotation over a peak of a force curve generated by the permanent magnet assembly. The force curve dips into a negative counterclockwise rotation tendency, called the gate. The motor pushes the permanent magnet assembly over the gate into the next force curve. The gate, or force curve dip is timed with the motor impulse. The impulse of the motor optionally deforms the inside magnet relative to the rotating shaft 44, and preferably pulls the inside magnet away from the outside magnet during the force curve dip. By varying the amplitude and frequency of the voltage steps to the motor, a user, or another machine can control the output force from the output shaft 144.

The rotating spoke 42, or flywheel 88 can both be implemented simultaneously, or separately. A plurality of rotating spokes can be connected axially along a hub for stability in high frequency embodiments. The flywheel 88 embodiment is reached when the rotating spokes 42 are so interconnected, that they present at act more as a solid deformable object, rather than independent rotating spokes 42. The rotating spokes can be as few as two or three or as many as several hundred. The deformation of the rotating spokes, or optionally the flywheel 88 is tuned to the gate to be jumped over.

The outside housing 37 is preferably a metal cylinder capable of safely containing any catastrophic mechanical or structural failure. The orientation of the outside magnet preferably presents the outside magnet first polarity 36 at an opposite end of an outside magnet second polarity 38 such that the magnet is oriented at an angle to the outside housing 37. The geometric configuration of the ramp surface 135 is preferably a parabolic, or a first order or second order curve, or the like. The ramp 136 preferably has a drop-off face into which the outside magnet is mounted. The drop-off face preferably coincides approximately with the gate. The ramp has a surface conforming to the inside surface of the outside housing 37.

The rotating spoke 42 is preferably made of a flexible material such as fiberglass, or carbon fiber. A metal spring material, or plastic may also suffice. The rotating spoke 42 may be made more flexible toward the inside magnet, or toward the shaft. FIG. 5 shows an equally distributed bending of the rotating spoke. Providing greater bending toward the inside magnet allows angular displacement between the inside magnet and the outside magnet. When the inside magnet rotates relative to the outside magnet, the gate may be more easily jumped. After the rotating spoke 42, or the flywheel 88 is deformed in one direction, a restoring motion coincides with the passing of the magnetic gate.

From reviewing FIGS. 1-5 and from the above disclosure, the title of the invention becomes clear. The dual motor refers to a two motor configuration. The first motor is the standard electrical motor which drives the second motor which is the permanent magnet motor.

The invention claimed is:

1. A dual motor comprising:
   a. a shaft;
   b. a first motor connected to the shaft, wherein the first motor is a standard electrical motor receiving voltage steps, and providing a rotational force to the shaft when the voltage is applied;
   c. a second motor also connected to the shaft, wherein the second motor is a permanent magnet motor comprising:
      i. a flexible member connected to the shaft at a flexible member inside end;
      ii. an inside magnet mounted to a flexible member outside end, wherein the inside magnet moves relative to the shaft;
      iii. an outside housing;
      iv. an outside magnet mounted to the outside housing, wherein stepped voltage application flexes the flexible member.

2. The dual motor of claim 1, wherein the outside housing further comprises a ramp, wherein the ramp is mounted to an inside surface of the outside housing, wherein the outside magnet is mounted to the ramp.

3. The dual motor of claim 2, wherein the ramp further comprises a drop-off surface, wherein the outside magnet is mounted to the drop-off surface.

4. The dual motor of claim 2, wherein the ramp further comprises a drop-off surface wherein the outside magnet is mounted to the drop-off surface so that the outside magnet is at an angle to the drop-off surface.

5. The dual motor of claim 1, wherein the outside housing further comprises a ramp, wherein the ramp is mounted to an inside surface of the outside housing, wherein the outside magnet is mounted to the ramp, wherein an outside magnet first polarity repels against an inside magnet second polarity.

6. The dual motor of claim 1, wherein the inside magnet and outside magnet repel from each other as they draw closer, and repel as they draw apart, wherein a magnetic gate is formed at the area where repulsion is greater.

7. The dual motor of claim 6, wherein the flexible member bends to pull the inside magnet away from the outside magnet when repulsion is greater.

8. The dual motor of claim 7, wherein the flexible member is a flywheel.

9. The dual motor of claim 7, wherein the flexible member is a rotating spoke.

10. A dual motor comprising:
    a. a shaft;
    b. a first motor connected to the shaft, wherein the first motor is a standard electrical motor receiving voltage steps, and providing a rotational force to the shaft when the voltage is applied;
    c. a second motor also connected to the shaft, wherein the second motor is a permanent magnet motor comprising:
       i. a flexible member connected to the shaft at a flexible member inside end;
       ii. an inside magnet mounted to a flexible member outside end, wherein the inside magnet moves relative to the shaft;
       iii. an outside housing;
       iv. an outside magnet mounted to the outside housing, wherein stepped voltage application flexes the flexible member so that the outside magnet rotates relative to the inside magnet.

11. The dual motor of claim 10, wherein the outside housing further comprises a ramp, wherein the ramp is mounted to an inside surface of the outside housing, wherein the outside magnet is mounted to the ramp.

12. The dual motor of claim 11, wherein the ramp further comprises a drop-off surface, wherein the outside magnet is mounted to the drop-off surface.

13. The dual motor of claim 12, wherein the ramp further comprises a drop-off surface wherein the outside magnet is mounted to the drop-off surface so that the outside magnet is at an angle to the drop-off surface.

14. The dual motor of claim 10, wherein the outside housing further comprises a ramp, wherein the ramp is mounted to an inside surface of the outside housing, wherein the outside magnet is mounted to the ramp, wherein an outside magnet first polarity repels against an inside magnet second polarity.

15. The dual motor of claim 10, wherein the inside magnet and outside magnet repel from each other as they draw closer, and repel as they draw apart, wherein a magnetic gate is formed at the area where repulsion is greater.

16. The dual motor of claim 15, wherein the flexible member bends to pull the inside magnet away from the outside magnet when repulsion is greater.

17. The dual motor of claim 16, wherein the flexible member is a flywheel.

18. The dual motor of claim 17, wherein the flexible member is a rotating spoke.

* * * * *